(12) United States Patent  
Gerdes et al.

(10) Patent No.: US 8,181,070 B2  
(45) Date of Patent: May 15, 2012

(54) ERROR DETECTION IN A NETWORKED EMBEDDED SYSTEM

(75) Inventors: Christoph Gerdes, München (DE); Christian Kleegrewe, Eching (DE); Götz Neumann, Berlin (DE); Sebnem Rusitschka, München (DE); Alan Southall, Walldorf (DE); Christoph Tscheschner, Schönwalde (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/740,701

(22) PCT Filed: Oct. 15, 2008

(86) PCT No.: PCT/EP2008/063836  
§ 371 (c)(1), (2), (4) Date: Apr. 30, 2010

(87) PCT Pub. No.: WO2009/071377  
PCT Pub. Date: Jun. 11, 2009

(65) Prior Publication Data  
US 2010/0262869 A1 Oct. 14, 2010

(30) Foreign Application Priority Data  
Dec. 4, 2007 (DE) .................. 10 2007 058 336

(51) Int. Cl.  
*G06F 11/00* (2006.01)

(52) U.S. Cl. .................. 714/47.1; 714/4.1; 714/48

(58) Field of Classification Search .................. None  
See application file for complete search history.

(56) References Cited

U.S. PATENT DOCUMENTS 5,761,412 A * 6/1998 Higgins .................. 714/4.1  
7,788,522 B1 * 8/2010 Abdelaziz et al. .................. 714/4.1

FOREIGN PATENT DOCUMENTS

DE 4443218 A1 4/1996  
DE 19636384 C2 11/2002  
EP 1675005 A2 6/2006

* cited by examiner

*Primary Examiner* — Michael Maskulinski  
(74) *Attorney, Agent, or Firm* — Laurence A. Greenberg; Werner H. Stemer; Ralph E. Locher

(57) ABSTRACT

A method for detecting errors in a networked embedded system having a multiplicity of components. Error and/or diagnostic data which are relevant to a component are stored in a set of further components of the networked embedded system and are determined if necessary (for example if a disturbance, error or failure occurs). This method is used, in particular, to find error and/or diagnostic data relating to a failed component of a networked embedded system.

14 Claims, 3 Drawing Sheets

ERROR DETECTION IN A NETWORKED EMBEDDED SYSTEM

The present invention relates to a method for detecting errors in a networked embedded system and to components whose embodiment enables the method to be performed. The present invention furthermore relates to the use of the above-cited method for locating error and/or diagnostic data relating to a component that has failed in the system. The present invention also relates to a computer program which is embodied to perform the above-cited method, and to a data medium which has the computer program.

BACKGROUND OF THE INVENTION

In a networked embedded system, detecting or locating error and/or diagnostic data relevant to a component can be very time-consuming and labor-intensive. This applies in particular when all the components have their own data store in which they store their relevant information or data, for example status data, error data or general operating information.

In the case of malfunctions or faults or a total failure of components in the network or in the networked embedded system it is usually difficult or even impossible to gain access to error and/or diagnostic data relevant to some or all of the affected components. This makes diagnosing the error very complicated, labor-intensive and time-consuming. This is the case above all when storage facilities containing the error and/or diagnostic data relevant to components (such as e.g. status data, error or fault information) or their interfaces are defective.

In order to determine the causes of a fault, to locate errors and/or to establish a corresponding diagnosis it is important to be able to record and analyze information relating to the affected or relevant components of the networked embedded system. Due to a failure of connections between the components or in the event of failure of the components themselves it becomes impossible in the existing networked embedded systems to read out from the system any information present that is necessary for locating errors or for establishing a diagnosis.

The generally known networked embedded systems usually offer the following two approaches for storing error and/or diagnostic data which is relevant to components of the networked embedded system and can be drawn upon for analysis and for establishing a diagnosis in the event of a fault or an error in the networked embedded system.

One possibility is the use of centralized solutions for storing error and/or diagnostic data relating to the components of a networked embedded system. The individual components send their current data or information to a central storage facility. Said storage facility must be implemented as permanently available and failsafe, especially in safety-critical systems such as, for example, installations for controlling chemical processes. This is technically very complicated and expensive, however. But in non-safety-critical manufacturing plants too, a huge investment of resources is necessary with regard to the fault tolerance of the error store, since long diagnosis times result in production downtimes, which in turn is very expensive. If the connection between the components of the networked embedded system and the centralized storage facility fails, it is no longer possible to gain access to the data or information that may be relevant to locating a fault or error that has occurred and/or to establishing a diagnosis.

In a further approach, the error and/or diagnostic data is stored in the component itself, as already indicated heretofore. This is the case, for example, in systems designed for engine management of cars, where the error data is stored in the respective component itself. In the case of a total failure of a component the error store can no longer be accessed. This makes error diagnosis impossible. The consequence is that the entire component has to be replaced. This leads to a successful outcome only if the cause of the error or fault lay directly in the replaced component. If, however, the cause for the failure of the replaced component lay in a malfunction of a further component indirectly or directly connected to the replaced component, this will result in recurrent failures of the replaced component since the cause of the error could not be identified with certainty. No full diagnosis could therefore be made. Consequently no complete elimination of the error is guaranteed.

SUMMARY OF THE INVENTION

The object of the present invention consists in providing an improved method for detecting errors in a networked embedded system.

The object is achieved by means of a method as claimed, by means of a use of the method as claimed, by means of a component of a networked embedded system as claimed, by means of a computer program as claimed, and by means of a data medium as claimed.

Advantageous developments of the present invention are set forth by way of example in the dependent claims.

The object is achieved by means of a method for detecting errors in a networked embedded system having a multiplicity of components, wherein the method comprises: storing of error and/or diagnostic data relevant to a component in a set of further components of the networked embedded system; and determining the error and/or diagnostic data relevant to the component in the set of further components of the networked embedded system.

By storing error and/or diagnostic data error relevant to a component in a set of further components it is ensured that the error and/or diagnostic data relating to the component can be retrieved even if said component fails or cannot be reached for other reasons (e.g. due to a fault). Storing the information in a set of components affords the advantage that there are a number of possibilities for accessing the error and/or diagnostic data relating to the failed and/or unreachable component. This increases the probability that in the event of a major or more serious fault the error and/or diagnostic data relating to the components that were adversely affected by the fault or that even failed due to the fault is available in the system and can be retrieved.

Components of a networked embedded system are, for example, field devices of a transformer station, computers having software, and control devices networked by means of a CAN (Controller Area Network) bus, and are well-known from the prior art.

Depending on the situation, error and/or diagnostic data relevant to a component of the networked embedded system can also include status data of the component and/or other information or data that is important for operating the component.

The error and/or diagnostic data relevant to the component is stored redundantly in the set of further components. In other words, the further components possess the same error and/or diagnostic data relating to the one component. During the querying of said error and/or diagnostic data, that further component which can be reached quickest and/or most reliability in the given situation can therefore be selected.

The size of the set of further components can be predefined. In this way a desired level of redundancy of the redundant storage is ensured, which signifies flexibility in the handling of the error and/or diagnostic data. Thus, for example, it is possible to predefine different redundancy levels according to the importance and/or type of the error and/or diagnostic data. More important error and/or diagnostic data can therefore be stored with a higher redundancy level, i.e. in a larger set of further components, than less important data. This allows not only reliable, but also flexible handling of the system.

Furthermore, an index structure cam be implemented in the components of the networked embedded system in order to permit fast and flexible location of the set of further components in which the error and/or diagnostic data relating to the component is to be stored. In this case a hash value is determined by means of a key of the one component, the set of further components is identified using the hash value, and the hash value is stored in the index structure as an index for the component and the identified set of further components. The index structure can be implemented here as, for example, a hash table, in particular a distributed hash table.

As indicated above, the error detection method also includes determining the error and/or diagnostic data relevant to the component in the set of further components of the networked embedded system. A requirement for determining the error and/or diagnostic data relevant to the component is that said error and/or diagnostic data is stored in the networked embedded system as outlined above and explained in more detail below or that such a storage is possible at all. The process of determining itself is not, however, unconditionally dependent on the step of storing and can be implemented independently at any time and as necessary.

Determining the error and/or diagnostic data relevant to the component in the set of further components of the networked embedded system can in this case comprise the following steps: determining the hash value by means of the key of the component; identifying the set of further components using the hash value; and reading out the error and/or diagnostic data relevant to the component from a further component of the identified set of further components.

The above-cited object is also achieved by means of use of the method for locating error and/or diagnostic data of a failed component of a networked embedded system outlined above and explained in greater detail below. The failed component can be, for example, a damaged component, a component that has completely failed in the system or a component that can no longer be reached due to a fault or an error.

In this case each of the components of the networked embedded system can be embodied to indicate its own current status by means of a cyclical sending of messages to at least one predetermined component of the networked embedded system, wherein a component which fails to indicate its own current status within a time interval is identified as the failed component. In this way fast and flexible detection of components affected by a fault or failed components is ensured. The error and/or diagnostic data relevant to the failed or unreachable component and stored according to the invention is ascertained as outlined above.

The object is achieved in addition by means of a component of a networked embedded system, the component being embodied to perform the method outlined above and explained in greater detail below.

In this case the component can be embodied to be used for locating error and/or diagnostic data of a failed or unreachable component.

The component can in this case have at least one storage facility for storing error and/or diagnostic data relevant to at least one second component.

Furthermore the component can be embodied in such a way that error and/or diagnostic data relevant to said component is stored in at least one further component of the networked embedded system.

The object is achieved in addition by means of a computer program which has a coding which is embodied to perform steps of the method outlined above and described in greater detail below for managing error and/or diagnostic data relating to components. The computer program can optionally be stored on a data medium.

Furthermore the object is achieved by means of a data medium which has the computer program outlined hereintofore.

This enables the error and/or diagnostic data relating to individual components to be distributed in the system. By storing error and/or diagnostic data in a decentralized manner such as this it becomes possible to reliably and quickly locate error and diagnostic data and other relevant information of defective components.

Furthermore the above-outlined failure detection of individual components permits fast pinpointing of the failed system component(s) and timely troubleshooting of errors or faults in the system.

BRIEF DESCRIPTION OF THE DRAWINGS

The invention is described in detail below with reference to the exemplary embodiments as illustrated in the appended figures, in which.

DESCRIPTION OF THE EXEMPLARY EMBODIMENTS

The exemplary embodiments described below explain the method for detecting errors in a networked embedded system. The method constitutes a distribution of information relevant to the components, which is to say error and status data, of all components in an information space. The information space is formed by all the components present in the system. All the components involved in this information space make storage available for the purpose of backing up status data of other components. The status data of a specific component is stored on the component itself in exceptional cases only. In order to increase the reliability of the information space, all the information can be stored redundantly multiple times. Information is located in the information space by means of mechanisms which are dependent on the type of information distribution. In order to stabilize the information space it is necessary to detect the failure of a component as quickly and reliably as possibly so that no information relating to such a component can be lost. For this purpose use is made in the following exemplary embodiments of a heartbeat protocol with which individual components cyclically send short messages to certain other components and thereby communicate their current status (online status) to said other components. If a component in the system fails, two mechanisms come into action, as will be described in more detail below. Firstly, all the information describing the failed component itself is present redundantly in the system and can be found with little effort in the distributed information space and used for the diagnosis, for example.

Secondly, the use of the heartbeat protocol enables a failure of a specific component to be unambiguously and quickly detected and identified. All the information stored on said component can be redistributed in the system again owing to the redundancy of the information storage and consequently can be reconstructed. The availability of the information is thus assured and the failed component identified.

Figure 1A:
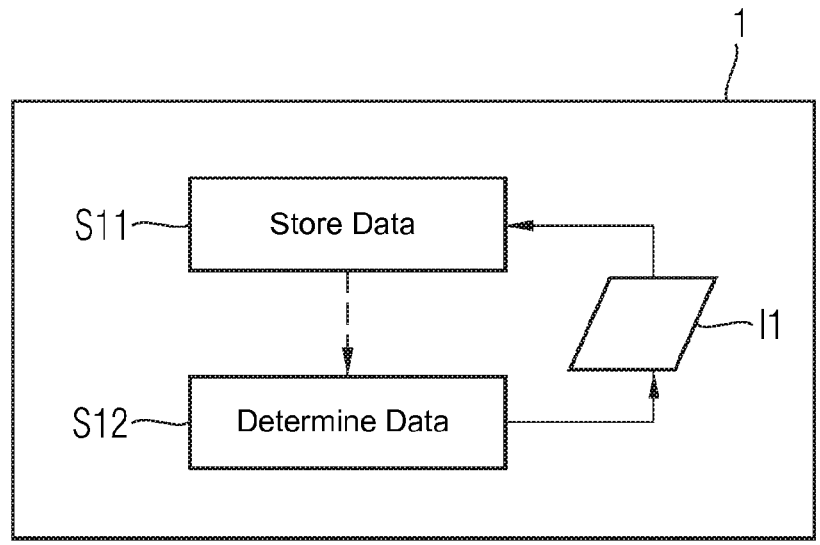
FIGS. 1a to 1c show flowcharts comprising the steps of the method for detecting errors in a networked embedded system.

FIG. 1a shows a flowchart in which the detection 1 of errors that occur in at least one component of the networked embedded system is illustrated. The detection 1 of the errors of the components includes both the storing S11 and the determining S12 of error and/or diagnostic data I1 relevant to a component of the networked embedded system. In this case the error and/or diagnostic data I1 relevant to a component is stored S11 in a set of further components of the networked embedded system.

The error and/or diagnostic data I1 relating to the component can be determined independently of the step of storing S11. It is, however, a prerequisite that the error and/or diagnostic data I1 is stored according to step S11 in the components of the system.

Figure 1B:
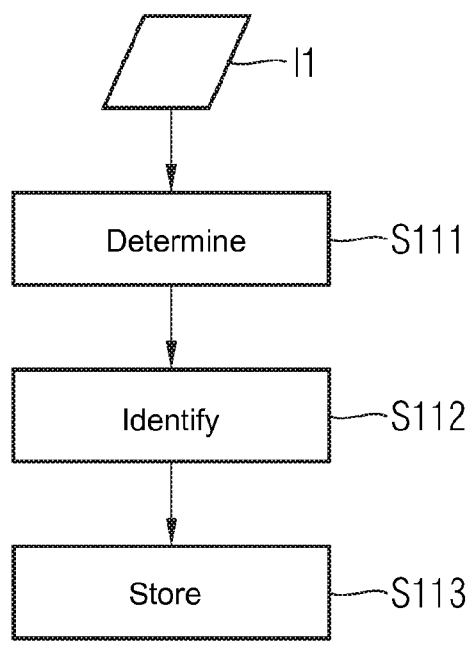

FIG. 1b shows a flowchart comprising the steps which specify in more detail how the storing S11 of error and/or diagnostic data I1 relevant to a component is performed. The error and/or diagnostic data I1 is stored redundantly in a set of further components, its being possible to predefine the size of the set of further components. If it has been determined, for example, that the error and/or diagnostic data is to be stored redundantly in triplicate, the size of the set has the value 3, meaning that the set has three components storing the error and/or diagnostic data I1.

In this scenario an index structure is implemented in each component, for example in the form of a (distributed) hash table. In the present exemplary embodiment the information space is implemented as a hash table distributed over all the components in the system. Information is stored in said hash table in the form of keys/value pairs. The hash value is formed via the key. Said hash value identifies those components in the information space on which the relevant error and/or diagnostic data is stored.

If a search for relevant error and/or diagnostic data relating to the failed component is performed at a later time, for example when a component fails, the key (or, in the case of specialized search methods, a part of the key) is required in order, through use of a corresponding hash function, to find the hash value of the key, which hash value in turn identifies the components on which the relevant error and/or diagnostic data relating to the failed component is stored. In this way the searched-for error and/or diagnostic data stored on the components identified by means of the hash value can be retrieved.

The storing of the error and/or diagnostic data therefore includes the determining S111 of a hash value by means of a key of the component, the identifying S112 of the set of further components using the hash value, and the storing S113 of the hash value as an index for the component and the identified set of further components in the index structure.

Figure 1C:
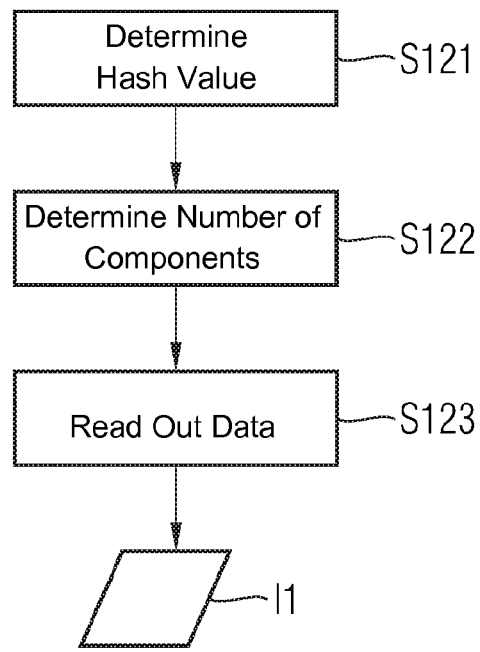

FIG. 1c shows a flowchart comprising the steps which describe the determining S12 of the error and/or diagnostic data I1 in the set of further components of the networked embedded system. In this case the hash value is determined S121 by means of the key of the component in relation to which the error and/or diagnostic data I1 is being searched for or queried. The set of components storing the error and/or diagnostic data I1 is identified S122 using the thus determined hash value. The distributed hash table is used for this. The error and/or diagnostic data I1 is then read out S123 from a component of the identified set of further components.

Figure 2:
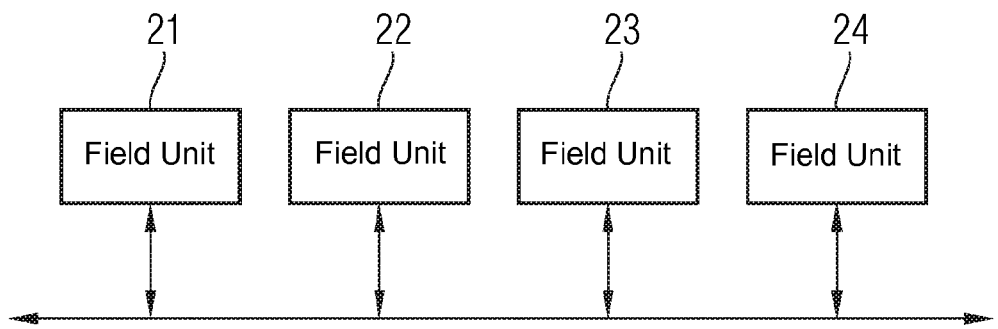
FIG. 2 shows devices of the field level of a transformer station according to an exemplary embodiment of the present invention.

FIG. 2 shows an exemplary system in which the described method can be used by way of example for a distributed storage of fault records as error and/or diagnostic data relevant to components, the system representing a transformer station having field devices 21, 22, 23, 24 in substations.

The automation of a transformer station can be roughly organized on two levels: the control level and the field level. Whereas computer units serving for control and monitoring are mainly assigned to the control level, the field level comprises sensors, switches and protection devices 21, 22, 23, 24 which safeguard the process interfacing functionality. All the devices 21, 22, 23, 24 involved in switching and protection operations have what are called event memories which serve for archiving completed switching operations or for logging errors that have occurred. Events are transmitted directly or in compressed form to the control center, where they are processed further and archived. In cases of malfunctions the field devices 21, 22, 23, 24 generate what are termed fault records which record error data at a frequency of 1 kilohertz over 8 seconds. The typical size of a fault record is between 1 Mbyte and 10 Mbytes. Fault records are initially stored locally in the field devices 21, 22, 23, 24 and then read out by the network control system at a later time.

In serious error cases the error store can be damaged before the data can be retrieved by the network control system, with the result that it is no longer possible to reconstruct with certainty which events have taken place or, as the case may be, which errors have occurred.

Figure 3:
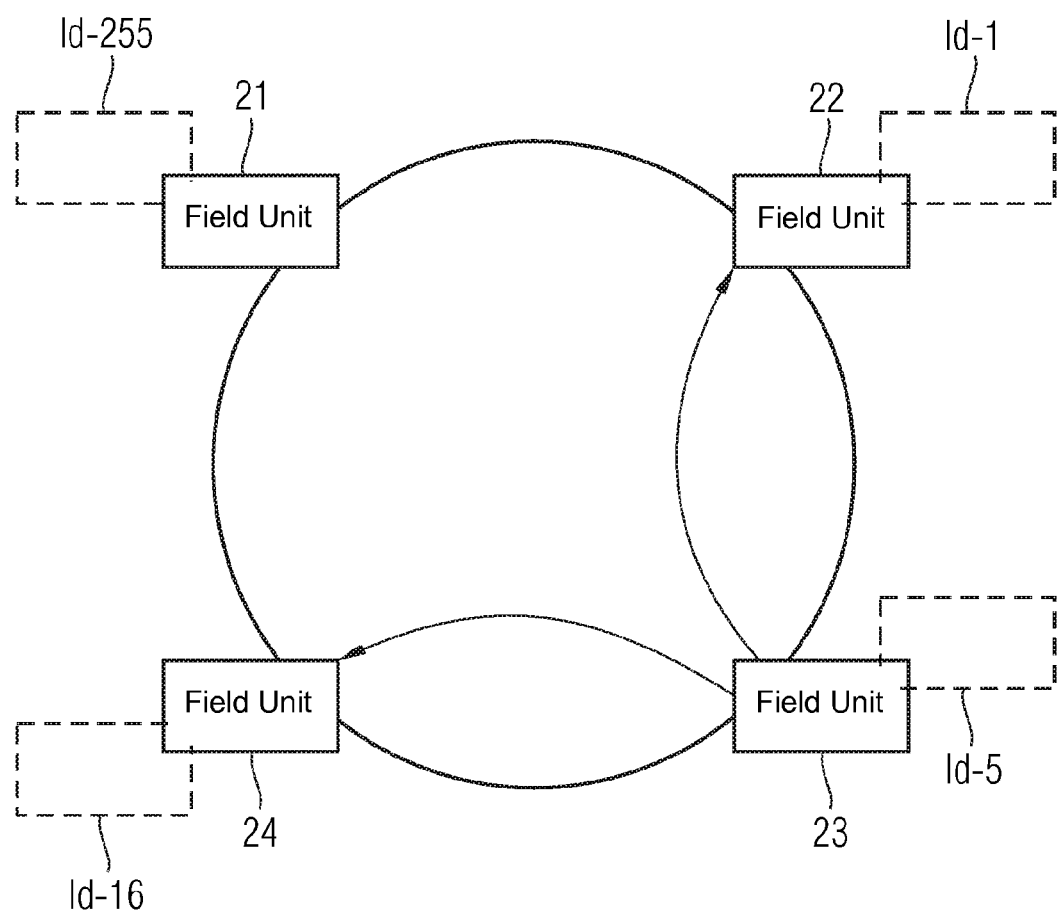
FIG. 3 shows devices of the field level of a transformer station having the indices assigned to them according to the exemplary embodiment of the present invention.

FIG. 3 shows devices 21, 22, 23, 24 of the field level of a transformer station having their assigned indices Id-1, Id-5, Id-16, Id-225 in an information space for information management according to the exemplary embodiment of the present invention.

In the present exemplary embodiment the field devices 21, 22, 23, 24 of a substation form a peer-to-peer (P2P) network. Error and status data, that is to say fault records and switching logs, are stored in a distributed manner across the P2P network. This data is stored redundantly in this case so as to ensure that if a device 21, 22, 23, 24 fails its data will not be lost, but can be obtained from other devices 21, 22, 23, 24.

In the present exemplary embodiment the further components 22 and 24 are selected as the components storing error and/or diagnostic data relevant to the component 23. In this case dual redundancy of the storing of the relevant error and/or diagnostic data is ensured. The switching logs and fault records of the component 23 are therefore stored in the components 22 and 24. The size of the set of further components, in other words the redundancy level, can be predefined in the present method.

In the event of the failure of a component 23 the error and/or diagnostic data stored redundantly in the further components 22 and 24 is determined by means of the described method with reference to the stored hash table and used for error diagnosis and recovery.

Units from the control level can also be incorporated into the P2P system for the purpose of further stabilization. Their presence is not absolutely essential, however.

Accordingly, the present invention relates to a method for detecting errors in a networked embedded system having a multiplicity of components. With said method, error and/or diagnostic data relevant to a component is stored in a set of further components of the networked embedded system and determined as necessary (e.g. upon occurrence of a fault, an error or a failure). Said method is used in particular for locating error and/or diagnostic data relating to a failed component of a networked embedded system.

Although the invention is explained in the foregoing with reference to the exemplary embodiments as illustrated in the attached drawings, it is evident that the invention is not limited to said exemplary embodiments, but can be modified within the spirit and scope of the inventive concept disclosed above and in the dependent claims. It is understood that there can also be further exemplary embodiments which represent the principle of the invention and are equivalent, and that various modifications can therefore be implemented without departing from the scope of the invention.

The invention claimed is:

1. A method for detecting errors in a networked embedded system having a multiplicity of components, the method which comprises:
storing data selected from the group consisting of error data and diagnostic data relevant to a component in a set of further components of the networked embedded system; and
determining the error and/or diagnostic data relevant to the component in the set of further components of the networked embedded system, by:
determining a hash value by way of a key of the component;
identifying a set of further components using the hash value; and
reading out the error and/or diagnostic data relevant to the component from a further component of the set of further components thus identified.

2. The method according to claim 1, which comprises storing the error and/or diagnostic data relevant to the component redundantly in the set of further components.

3. The method according to claim 1, wherein a size of the set of further components is predetermined.

4. The method according to claim 1, wherein an index structure is implemented in the components of the networked embedded system, and the method further comprises:
determining a hash value by way of a key of the component;
identifying a set of further components using the hash value; and
storing the hash value as an index for the component and the identified set of further components in the index structure.

5. The method according to claim 4, wherein the index structure is implemented as a hash table.

6. In a networked embedded system, a method for locating error and/or diagnostic data of a failed component of the networked embedded system, the method which comprising:
carrying out the method according to claim 1 to locate the error and/or diagnostic data of the failed component.

7. The method according to claim 6, wherein each of the components of the networked embedded system is configured to indicate a current status thereof by way of a cyclical sending of messages to at least one predetermined component of the networked embedded system, and the method further comprises identifying a component that fails to indicate the current status within a given time interval as the failed component.

8. In a networked embedded system, a component of the networked embedded system configured to perform the method according to claim 1.

9. The component according to claim 8, wherein each of the components of the networked embedded system is configured to indicate a current status thereof by way of a cyclical sending of messages to at least one predetermined component of the networked embedded system, and the component is configured to identify a component that fails to indicate the current status within a given time interval as the failed component.

10. The component according to claim 8, wherein the component is configured such that error and/or diagnostic data relevant thereto is stored in at least two further components of the networked embedded system.

11. The component according to claim 8, wherein the component includes at least one memory device for storing error and/or diagnostic data relevant to at least one other component.

12. A computer program stored on a non-transitory computer-recordable medium executing on a computer, comprising computer program code configured to perform the steps of the method according to claim 1 when loaded into a processor of a computer.

13. A non-transitory computer-readable data medium including, computer program code configured to be loaded into a processor of a computer and to cause the processor to perform the steps of the method according to claim 1.

14. A method for detecting errors in a networked embedded system having a multiplicity of components, the method which comprises:
storing data selected from the group consisting of error data and diagnostic data relevant to a first component, in a set of further components of the networked embedded system, the data to be stored being transmitted by the first component to the further components; and
determining the error and/or diagnostic data relevant to the component in the set of further components of the networked embedded system, by:
determining a hash value by way of a key of the component;
identifying a set of further components using the hash value; and
reading out the error and/or diagnostic data relevant to the component from a further component of the set of further components thus identified.

* * * * *